(No Model.) 5 Sheets—Sheet 1.
L. CUTSHAW.
SYSTEM FOR CABLE RAILROADS.

No. 449,466. Patented Mar. 31, 1891.

WITNESSES: Chas. Nida. C. Sedgwick.

INVENTOR: L. Cutshaw
BY Munn & Co.
ATTORNEYS (No Model.) 5 Sheets—Sheet 2.
L. CUTSHAW.
SYSTEM FOR CABLE RAILROADS.
No. 449,466. Patented Mar. 31, 1891.
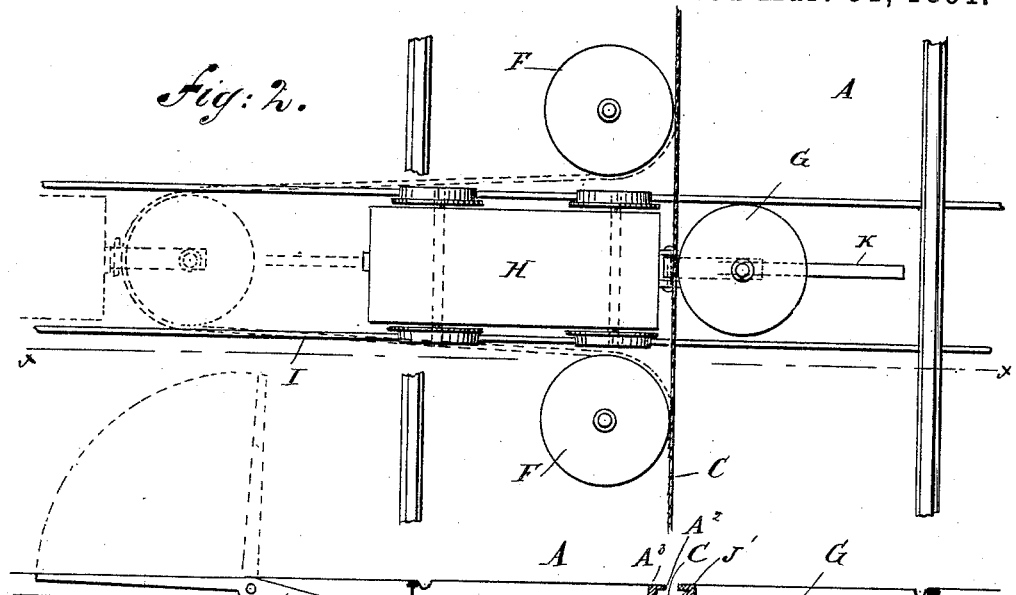
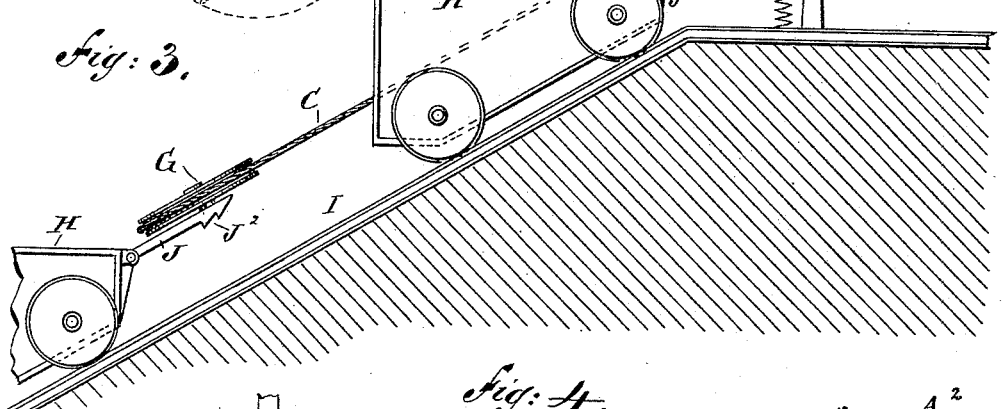
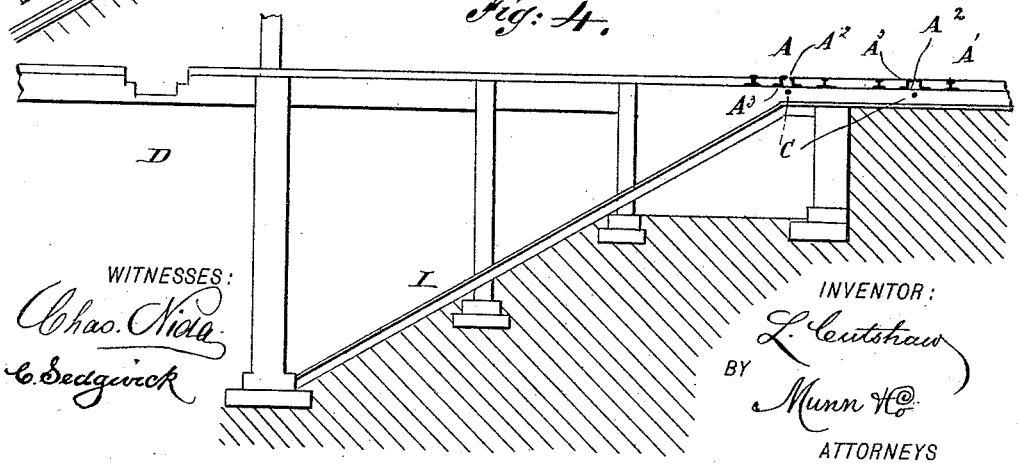
WITNESSES:
Chas. Nida
C. Sedgwick
INVENTOR:
L. Cutshaw
BY
Munn & Co.
ATTORNEYS (No Model.) 5 Sheets—Sheet 3.

L. CUTSHAW.
SYSTEM FOR CABLE RAILROADS.

No. 449,466. Patented Mar. 31, 1891.

WITNESSES:
Chas. C. Niola
C. Sedgwick

INVENTOR:
L. Cutshaw
BY Munn & Co.
ATTORNEYS

THE NORRIS PETERS CO., PHOTO-LITHO., WASHINGTON, D. C.

(No Model.) 5 Sheets—Sheet 4.

L. CUTSHAW.
SYSTEM FOR CABLE RAILROADS.

No. 449,466. Patented Mar. 31, 1891.

WITNESSES:
Chas. Nider.
C. Sedgwick.

INVENTOR:
L. Cutshaw
BY Munn & Co.
ATTORNEYS

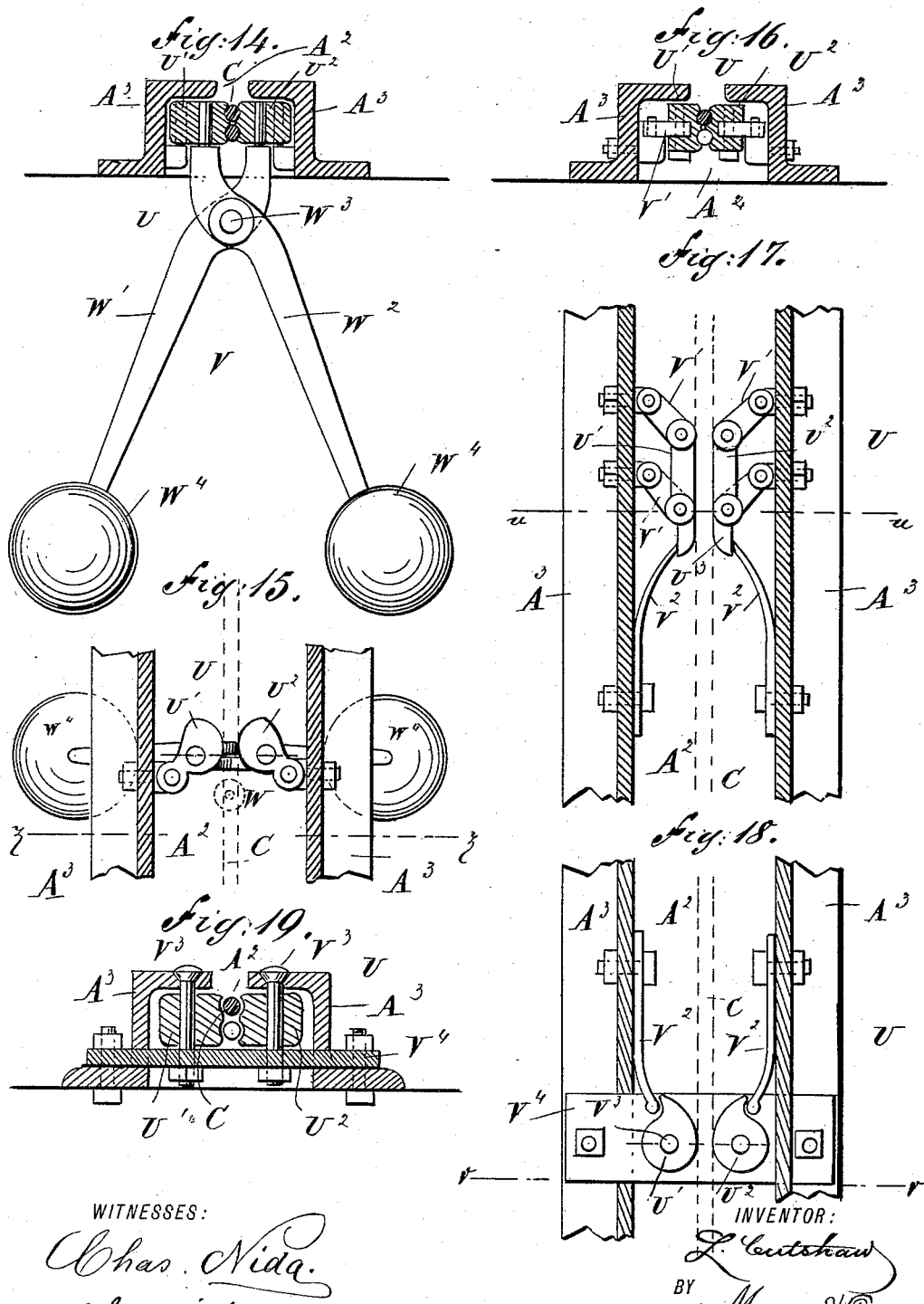

UNITED STATES PATENT OFFICE.

LEONARD CUTSHAW, OF DENVER, COLORADO.

SYSTEM FOR CABLE RAILROADS.

SPECIFICATION forming part of Letters Patent No. 449,466, dated March 31, 1891.

Application filed November 20, 1890. Serial No. 372,047. (No model.)

*To all whom it may concern:*

Be it known that I, LEONARD CUTSHAW, of Denver, in the county of Arapahoe and State of Colorado, have invented a new and Improved System for Cable Roads, of which the following is a full, clear, and exact description.

The invention relates to still-cable roads, and its object is to provide a new and improved system which permits the use of double tracks, turn-outs, switches, crossings, &c.

The invention consists, principally, of an endless still cable and a double track.

The invention further consists of weights, each carrying a pulley adapted to engage part of the still cable to automatically take up and compensate for slack in the cable incident to taking cars on and off.

The invention also consists in a device for placing the cable on and off the drums of the cars and in a device for automatically clamping and releasing the cable in the double track.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
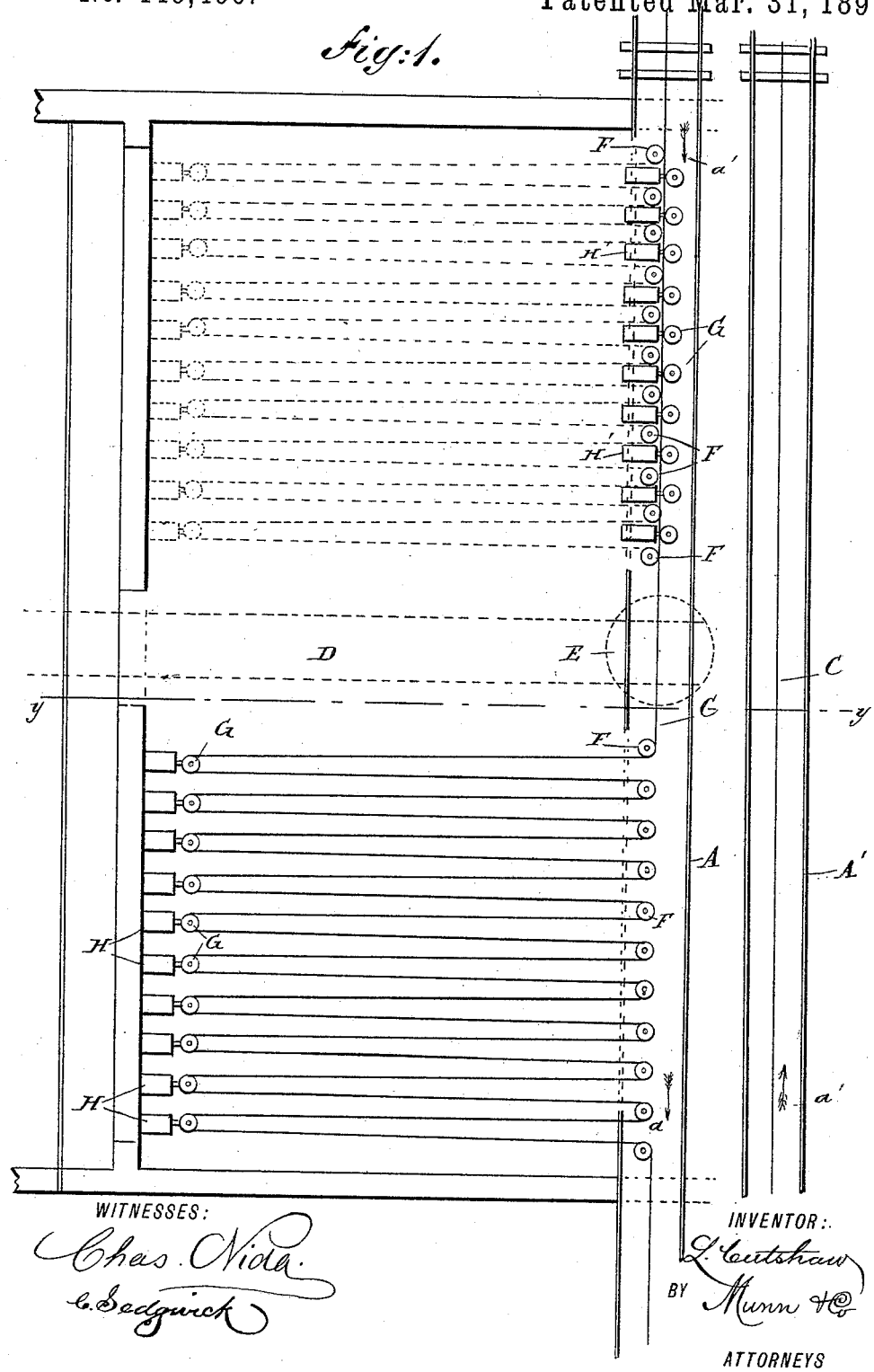
Figure 5:
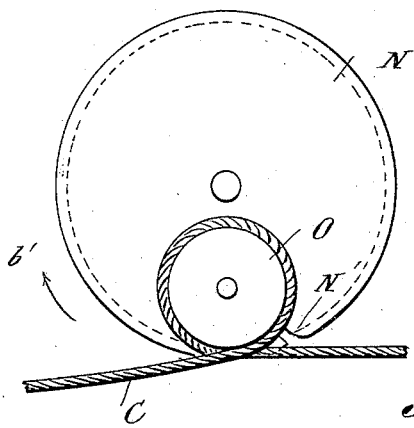
Figure 7:
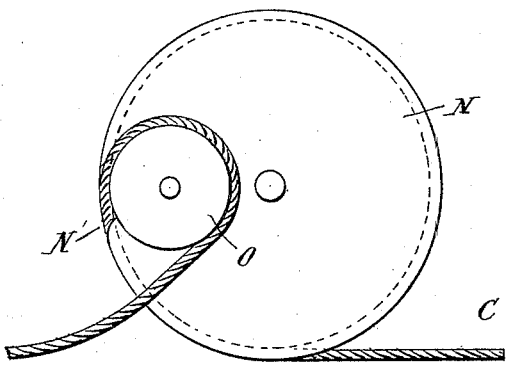
Figure 6:
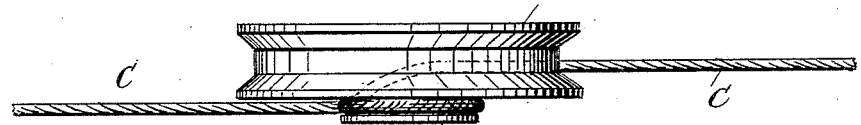
Figure 8:
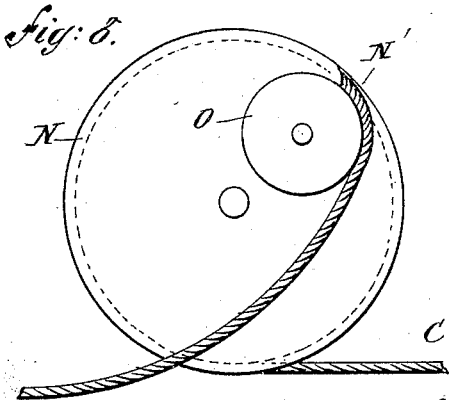
Figure 9:
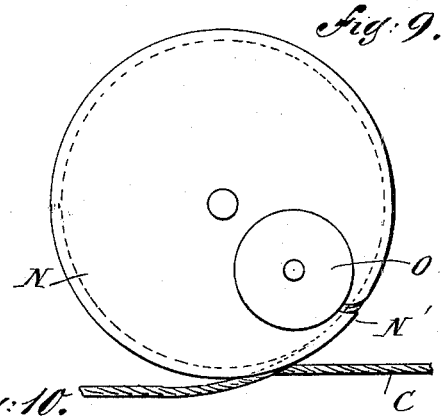
Figure 10:
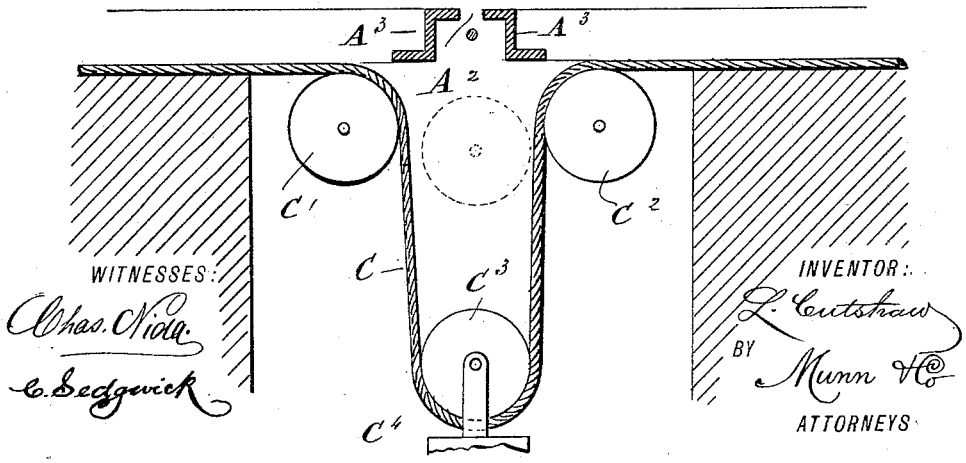
Figure 11:
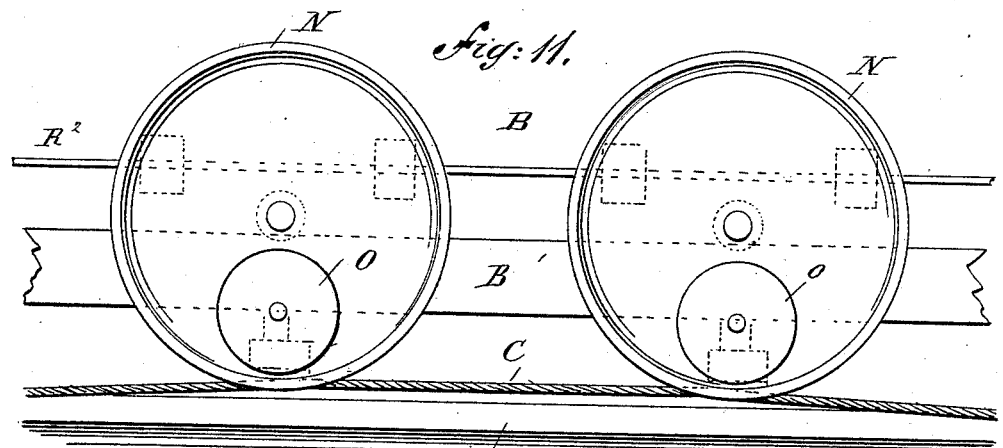
Figure 12:
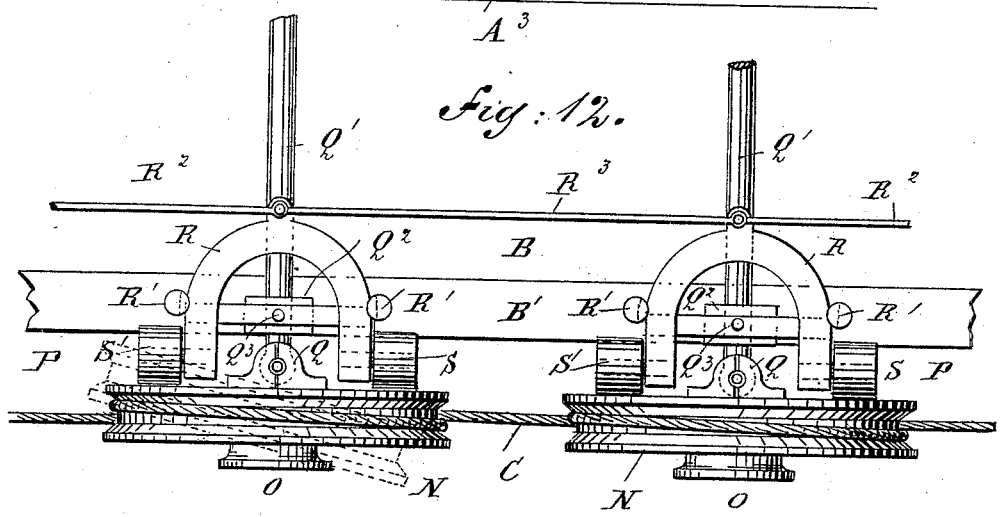
Figure 13:
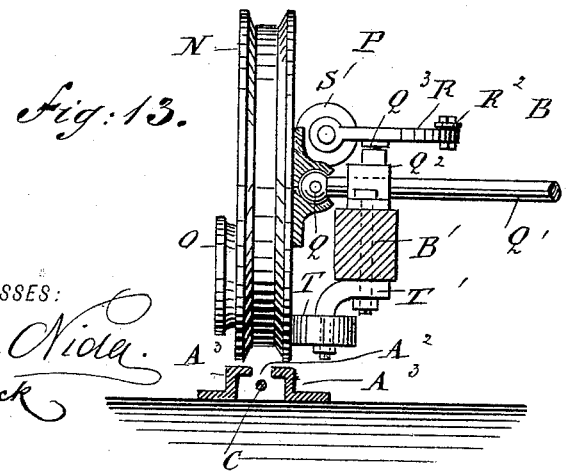

Figure 1 is a plan view of the improvement as applied to a forty-car system with all the cars housed and the slack taken up by the heavy weights. Fig. 2 is an enlarged plan view of one of the weights and its connections. Fig. 3 is a sectional side elevation of the same on the line $x\ x$ of Fig. 2. Fig. 4 is a sectional side elevation of the housing and track on the line $y\ y$ of Fig. 1. Fig. 5 is a side elevation of the device for taking the cable on or off the car-drum. Fig. 6 is a plan view of the same. Figs. 7, 8, and 9 are side elevations of the same in different positions. Fig. 10 is an enlarged transverse section of the cable at a crossing. Fig. 11 is a side elevation of the cable and winding-drums on the car-track. Fig. 12 is a plan view of the same. Fig. 13 is a transverse section of the same. Fig. 14 is an enlarged cross-section of the clamping device for the cable on the line $z\ z$ of Fig. 15. Fig. 15 is a plan view of the same, the slot or groove rails being in section. Fig. 16 is a transverse section of a clamping device of modified form and on the line $u\ u$ of Fig. 17. Fig. 17 is a plan view of the same, the groove-rails being in section. Fig. 18 is a plan view of another modified form of clamping device, the groove-rails being in section; and Fig. 19 is a transverse section of the same on the line $v\ v$ of Fig. 18.

In still-cable roads as heretofore constructed the ends of the cable were fastened at the ends of the line to permit the car to draw itself forward on the cable. In this mode of construction a double track with a single cable is not permissible. With my improved system a double track and a single endless cable are used, on which the cars can travel along on one track and return on the other. The endless cable is carried forward intermittently by the cars themselves, owing to the rolling off of the cable on the drum—that is to say, the cable is moved by each car a distance equal to the length of that part of the cable passed around the drum, the forward movement of the cable corresponding to this length of the cable on each complete circuit of the respective car. Slack in the cable is incident to putting on and taking off cars, owing to the fact that that part of the cable which is wound on the drum or unwound from the same must be provided for in the length of the cable—that is to say, the length of the cable must be as much longer than the track as the several drums of the number of the cars in the system take up.

In the accompanying drawings a double track with a forty-car system is illustrated, the double track comprising the up and down tracks A and A', containing the usual slot or groove $A^2$, formed by two oppositely-arranged Z-rails $A^3$, as plainly shown in the drawings. On the tracks are adapted to travel the cars B, and in the groove is laid the still endless cable C. The ends of the two tracks are connected with each other by suitable turn-tables or curves, as desired, so as to form an endless track containing the endless cable. On one of the two tracks at any desired point is arranged a housing D, in which the cars are stored when not in use. As shown in the accompanying drawings, the track A is connected with this housing D by a suitable turntable E, on which the cars are run from the track A to be moved over suitable tracks to the resting-place in the housing D.

At any convenient place along the track, preferably in the front of the housing, are arranged horizontally on fixed studs a series of pulleys F, over which the cable C passes, and between two successive pulleys on the opposite or outer side of the cable is arranged a pulley G, mounted on a weight H, preferably in the shape of a truck, as illustrated in the drawings, the truck being adapted to travel on an inclined track I, arranged at right angles to the double tracks. Each pulley G is mounted on a stud secured on a draw-bar J, hinged on the truck H, and the said pulley is adapted to strike against the free end of a spring J', held under the track, when the truck nears an uppermost position, so that the pulley G is thrown into a horizontal position under the track A and on the outside of the cable C. When the truck H travels downward on its track I, the draw-bar J swings into an inclined position, so that the pulley G extends parallel to the track I, as is plainly shown in Fig. 3. On the under side of the bar J are formed teeth or shoulders $J^2$, adapted to engage a spring-pressed notched bar K, pivoted under the track A and serving to automatically lock the truck H in an uppermost position, as shown at the right of Fig. 3. A lever L may also be employed for locking the truck H in place, the said lever being adapted to engage with its free end teeth L', formed on the rear end of the car. The lever L is also used for pushing the truck H into a locked position when nearing the upper end of the track I.

As shown in Fig. 1, I provide two sets of weights or weighted trucks H, of which one set is somewhat heavier than the other, so that the heavier set travels into a lowermost position, while the other lighter set is held in an uppermost position by the overbalancing-weight of the heavy set, the cable C then extending in a straight line between the pulleys F and G of the lighter set. (See upper part of Fig. 1.) With the heavier trucks H the cable passes over the first pulley F, (the one next to turn-table E,) and then down along the track I, over the pulley G of the first truck H, and then up over the second pulley F, then down again over the second track to the pulley of the next truck, and so on until the cable finally passes over the last pulley F again into the center of the track. This arrangement of trucks and pulleys compensates for the extra amount of cable needed for the working-drums N of the cars. When the cars are all housed, the two sets of weighted trucks H assume the above-mentioned position. (Illustrated in Fig. 1.) When all the forty cars of the system are on the double track, the extra length of cable for the car-drums N has been taken up by the latter and all the weighted trucks H are locked in an uppermost position, so that the cable passes all the sets of pulleys F and G in a straight line in front of the housing. It is understood that the length of the cable passing down the inclined track I of a truck H is about equal to the amount of cable necessary for the drums of four cars.

Now it is evident that the amount of cable taken from cars not on the track must be taken care of by each car on the track at the time it completes its circuit at the housing D. To explain this more fully we will suppose three cars of the forty cars of the system have been housed. Then the amount of cable taken from the drums of the housed cars has been taken up by the first heavy truck H near the turn-table E, the said truck standing about three-quarters' distance down its inclined track I. Now the first car coming in passes up to the turn-table E and within a short distance of the first fixed pulley F of the heavy set of trucks H. The car then, while at rest, winds up that part of the cable extending down the inclined track I in front of the car, so that the heavy truck is drawn upward until it locks itself automatically in an uppermost position by the means and in the manner previously described. The car then moves forward on the straight line of cable in front of the car and extending between the pulleys F and G of the heavy set of trucks H. The amount of cable paid off by the winding-drum in the rear of the car when the latter is at a standstill on the turn-table E is immediately taken up by the light truck H next to the turn-table, the said light truck descending the same distance down its track as the heavy truck was drawn up its track. As soon, however, as the car has left on its forward journey the heavy truck, after unlocking it, will descend again, drawing up the light truck to its former position. Each of the thirty-seven cars on the track will repeat this operation on completing their circuits at the housing D. In case only one car is on the track at the time, the other thirty-nine being housed, then this car at the completion of every circuit will have to wind up the extra amount of cable in front of the car and extending down the inclined tracks of all the heavy trucks H before it could proceed or start on a fresh journey. The amount of cable paid out by the drum at the rear of the car is taken up by the several light trucks H descending down their tracks until the light trucks are again drawn up by the heavier trucks when unlocked after the car has started on its journey. One revolution of a drum draws in the slack incident from one housed car, two from two housed cars, &c.

When a car is taken from the housing D to be put on the track, then the first lower heavy truck H is drawn up sufficiently to obtain the necessary length of cable to be put around the drum of the car. This of course is repeated until all the cars are on the track and all the trucks H are locked in an uppermost position.

In order to conveniently and quickly place the cable on and off the drums N of the cars on crossings or on starting the same, or taking the cars off the track at the housing, a device (illustrated in Figs. 5 to 13, inclusive) is provided. On the outer face of the winding-drum N is mounted to turn a small pulley O, extending with its periphery to within a short distance of the periphery of the drum. A slot N' is formed in the rim of the drum N adjacent to the periphery of the pulley O, the said slot leading to the base of the usual annular groove adapted to receive the cable and formed in the rim of the drum. In order to place the cable around the drum, the latter is turned until the pulley O stands in a lowermost position, as shown in Fig. 5. The cable C is now placed around this pulley, one part of the cable being passed through the slot N'. The drum N is now rotated in the direction of the arrow $b'$ by the driving machinery in the car or otherwise. The cable is carried upward by the pulley, and that part of the cable which extends rearward from the slot N' now passes into the annular groove of the drum, as plainly shown in Fig. 7. Further rotation of the drum gradually rolls off the part of the cable on the pulley (see Fig. 8) until this part finally passes entirely off the pulley and the cable at or near the full revolution of the drum is entirely off the pulley and wound once around the drum, as shown in Fig. 9. In order to take the cable off the drum, part of the cable in the groove is passed through slot N', and then the drum is rotated in an inverse direction to the arrow $b'$ until the cable falls off the drum. The amount of cable necessary to pass around the pulley O is derived at the housing D from drawing up the respective truck on the incline. At a crossing of this system with another cable road the cable underneath has to be thrown off the drum N at the car approaching the crossing and the cable is again taken up onto the drum after the crossing is passed by the car.

In order to take up the amount of cable thrown off the drum, the cable is passed over pulleys or idlers $C'$ and $C^2$ at opposite sides of the cable to be crossed, the cable passing under a pulley $C^3$, arranged between the pulleys $C'$ and $C^2$, and carrying a weight $C^4$, adapted to travel vertically in a suitable pit arranged at the crossing. As soon as the cable is thrown off the weight $C^4$ descends, drawing the slack of the cable down into the pit, and when the car has crossed and the cable is put upon the pulley O to be placed onto the drum in the manner above described then the weight $C^4$ is drawn up again to a normal position. Thus any necessary slack in the cable is given or taken up by this arrangement. (Fully shown in Fig. 10.) The means for throwing off the cable as above described require the operator to stop the car and to place the cable in the slot N'. Now to avoid stopping the car and drum and the danger accompanying placing the cable into the slot by hand I provide a simple device P, (more fully illustrated in Figs. 11, 12, and 13,) which is also used at the housing D when the car is to be stabled—that is, taken off the track.

The drum N is connected in its center by a universal joint Q with a shaft $Q'$, journaled in suitable bearings $Q^2$, secured on the beams $B'$ of the truck of the car B. The shaft $Q'$ is connected in any suitable manner with the machinery for propelling the car and located on the latter. On the top of the outermost bearing $Q^2$ of the shaft $Q'$ is formed or secured a vertical pivot $Q^3$, on which is mounted to turn a horizontally-arranged frame R, fitted to slide in suitable guideways $R'$, arranged on the top of the beam $B'$. The frame R carries at its ends friction-rollers S and $S'$, traveling against the inner face of the drum N at opposite sides of the universal joint Q. The inner end of the frame R is pivotally connected with a link $R^2$, connected with levers or other suitable mechanisms under the control of the operator in charge of the car. When two or more drums are used on one car, as illustrated in Figs. 11 and 12, then two frames are universally connected with each other by a link $R^3$, arranged in line with the links $R^2$, extending in opposite directions to the platforms of the car.

In order to hold each drum rigidly in a vertical position, a friction-pulley T is employed, mounted to turn on a bracket $T'$, secured to the under side of the beam $B'$, as is plainly shown in Fig. 13, so that the said roller stands vertically below the universal joint Q. If desired, a similar friction-roller may be arranged on the upper part of the drum N in a vertical line with the roller T or universal joint Q.

When the cable C is on the drum and the car is traveling on one of the tracks A or $A'$, and the car approaches a crossing, for instance, then the operator in charge of the car pulls on the respective link $R^2$, so as to turn the frame R on its pivot $Q^3$, whereby one of the friction-rollers S or $S'$ presses against the face of the drum N, so that the latter swings on its universal joint Q, so as to stand at angles to the line of the cable C. A further rotation of the drum N now causes the cable to slip off from the annular peripheral groove, so that the cable is thrown onto the ground, the slack being taken up by the pulley $C^3$ and its weight $C^4$. After the cable is thrown off of the drum or drums N the operator again shifts the link $R^2$, so as to move the frame R into the normal position, whereby the other friction-roller presses upon the opposite side of the drum to move the latter into its former position—that is, in line with the cable C. When the car has passed the crossing, the cable is again taken up in the manner previously described. When a car is approaching the turn-table E to be taken off of the track, then the above-described operation is repeated—that is, the drum N is moved into an angular position with relation to the line of the cable and the drum N is further revolved until the cable is thrown off. The car on the turn-table is then switched off the main track and housed.

It is evident that as the cable in this system is endless and not secured rigidly at any point of the track it must be held down temporarily in the slot or groove $A^2$ at terminals at the bottom of hills, if such are in the track, and at crossings, and, furthermore, the cable must be held in place temporarily at various points in the track against the pull of an approaching car. For this purpose automatic clamping devices, such as shown in Figs. 14 to 19, are employed.

Each clamping device U is provided with two jaws U' and $U^2$, adapted to clamp the cable C at opposite sides, the said clamps being held in contact with the cable either by weighted pivoted levers V, as shown in Figs. 14 and 15, or by springs $V^2$, as illustrated in Figs. 16 to 19. The jaws hold the cable in place until the pilot-wheel in the front of the winding-drum N of the approaching car B passes between the jaws, so as to open the same to permit the cable to rise and to pass onto the winding-drum. The jaws close as soon as the cable is out and the pilot-wheel has passed. When the drum has passed the clamping device and paid out the cable at its rear over the clamping device, then the rear pilot-wheel (shown in dotted lines in Fig. 15) again opens the jaws to permit the cable to drop between the jaws to be again clamped in place by the springs or weights.

It is understood that the jaws are pressed with sufficient tension exerted by the springs or weights against the cable to hold the same in place and against the pull of the approaching car.

As shown in Figs. 14 and 15, the jaws U' and $U^2$ are pivoted on centrally-arranged pivots secured to the inside of the vertical webs of the Z-shaped groove-rails $A^2$. The jaws are also connected with the upper ends of the two levers W' and $W^2$, extending vertically downward into a pit arranged below the groove-rails in the track. The levers are pivoted together at $W^3$ and then extend in opposite directions and carry weights $W^4$ at their lower ends. The levers thus form a pair of tongs adapted to close the jaws onto the cable by the weights $W^4$.

As illustrated in Figs. 16 and 17, the jaws U' and $U^2$ are each pivotally connected with two links V', extending horizontally and pivoted on the inside of the web of the respective groove-rail. A spring $V^2$, also secured to the web of the rail, presses with its free end on a projection $U^3$ on the respective jaw, so as to hold the latter in contact with the cable.

In the modification shown in Figs. 18 and 19 the jaws U' and $U^2$ are made in the shape of cams mounted to turn loosely on bolts $V^3$, arranged vertically and secured at one end to the top flange of the respective groove-rail $A^3$ and to a cross-plate $V^4$, bolted to the bases of the groove-rails. The springs $V^2$ press on lugs of the cams to hold the same in contact with the cable, thus clamping the same. The several jaws are all free to be opened by the pilot-wheel of the car to release and again take hold of the cable in the manner described.

I do not limit myself to the construction of the various devices as shown and described, as the same may be modified according to local conditions or other causes.

Having thus fully described my invention, I claim as new and desire to secure by Letters Patent—

1. A system for still-cable roads, comprising a double track and an endless still cable laid in the said track, substantially as shown and described.

2. A system for still-cable roads, comprising a double track, an endless still cable laid in the said track, and weights connected with the said cable for taking up the slack of the cable incident to taking on and off cars, substantially as shown and described.

3. In a system for still-cable roads, a still endless cable, substantially as shown and described.

4. In a system for still-cable roads, the combination, with an endless still cable, of fixed pulleys over which is adapted to pass the said cable and a second set of pulleys arranged between the other pulleys and carrying weights, substantially as shown and described.

5. In a system for still-cable roads, the combination, with an endless still cable, of means for clamping the cable in place, substantially as shown and described.

6. In a system for still-cable roads, the combination, with an endless still cable, of a clamping device provided with self-acting jaws adapted to clamp the said cable, substantially as described.

7. In a system for still-cable roads, the combination, with an endless still cable, of a clamping device provided with self-acting jaws adapted to clamp the said cable, the said jaws being hung on pivots to permit of opening the jaws by the pilot-wheel of the car, substantially as shown and described.

8. In a system for still-cable roads, the combination, with a double track, of an endless still cable laid in the said track and a revoluble winding-drum carried by the car and adapted to wind up the said cable to propel the car, substantially as described.

9. In a system for still-cable roads, the combination, with a double track, of an endless still cable laid in the said track, a revoluble winding-drum carried by the car and adapted to wind up the said cable to propel the car, and means for taking up the slack of the cable incident to taking the cable off the said drum, substantially as shown and described.

10. In a system for still-cable roads, the combination, with a double track, of an endless still cable laid in the said track, a revoluble winding-drum carried by the car and adapted to wind up the said cable to propel the car, and means, substantially as described, for placing the said cable onto the said drum, as set forth.

11. In a system for still-cable roads, the combination, with a double track, of an endless still cable laid in the said track, a revoluble winding-drum carried by the car and adapted to wind up the said cable to propel the car, and means, substantially as described, for throwing the cable off the drum, as set forth.

12. In a system for still-cable roads, the combination, with a double track, of an endless still cable laid in the said track, a revoluble winding-drum carried by the car and adapted to wind up the said cable to propel the car, and clamping devices, substantially as described, for clamping the said cable in the track, as set forth.

13. In a system for still-cable roads, a winding-drum adapted to be thrown into an angular position, substantially as described.

14. In a system for still-cable roads, the combination, with an endless still cable, of a winding-drum adapted to wind up the said cable and adapted to be thrown in an angular position to the said cable, substantially as described.

15. In a system for still-cable roads, the combination, with a cable, of a winding-drum adapted to wind up the said cable and adapted to be thrown in an angular position to the said cable, and means, substantially as described and under the control of the operator, for throwing the said drum into an angular position, as set forth.

16. In a system for still-cable roads, a winding-drum hung on a universal joint, substantially as described.

17. In a system for still-cable roads, the combination, with the drum-shaft mounted to turn, of a winding-drum and a universal joint for connecting the said shaft with the said drum, substantially as described.

18. In a system for still-cable roads, the combination, with a winding-drum hung on a revoluble universal joint, of means for throwing the said drum into an angular position, substantially as described.

19. In a system for still-cable roads, the combination, with a winding-drum and a revoluble shaft universally connected with the said drum, of means for throwing the said drum into an angular position relative to the axis of the said shaft, substantially as set forth.

20. In a system for still-cable roads, the combination, with a revoluble shaft, a drum, and a universal joint connecting the said shaft with the said drum, of a frame mounted to swing and friction-rollers held on the said frame and engaging one face of the said drum at opposite sides of the universal joint to throw the said drum into a right-angular or angular position relative to the axis of the said shaft, substantially as shown and described.

21. In a system for still-cable roads, the combination, with a revoluble shaft, a drum, and a universal joint connecting the said shaft with the said drum, of a frame mounted to swing, friction-rollers held on the said frame and engaging one face of the said drum at opposite sides of the universal joint to throw the said drum into a right-angular or angular position relative to the axis of the head-shaft, and fixed friction-rollers engaging the face of said drum at right angles to the other friction-rollers, substantially as described.

22. In a system for still-cable roads, the combination, with a revoluble shaft, a drum, and a universal joint connecting the said shaft with the said drum, of a frame mounted to swing, friction-rollers held on the said frame and engaging one face of the said drum at opposite sides of the universal joint to throw the said drum into a right-angular or angular position relative to the axis of the said shaft, and mechanism, substantially as described and under the control of the operator, for shifting the said frame, as set forth.

23. In a system for still-cable roads, a revoluble winding-drum provided on one face with a pulley and having a slot in its rim leading to said pulley, substantially as described.

24. In a system for still-cable roads, the combination, with an endless still cable, of a revoluble winding-drum having in its rim a slot adapted to receive the said cable and a grooved pulley held on the face of the said drum next to the said slot and adapted to receive the said cable, substantially as described.

25. In a system for still-cable roads, the combination, with an endless still cable, of a compensating device for the extra amount of cable for the winding-drums, substantially as described.

26. In a system for still-cable roads, the combination, with an endless still cable, of a compensating device for automatically taking care of the extra amount of cable for the winding-drums, the said device comprising two sets—namely, light and heavy weights—pulleys on the said weights and adapted to engage the said cable, and fixed pulleys adapted to engage the cable on the opposite side of the weight-pulleys, substantially as described.

27. In a system for still-cable roads, a compensating device for the cable, comprising two sets, heavy and light weights, pulleys held on the said weights and adapted to engage the cable, and a second set of fixed pulleys adapted to engage the said cable opposite the said weight-pulleys, substantially as described.

28. In a system for still-cable roads, the combination, with a double track containing the cable groove or slot, of an endless still cable laid in the said slot and having an extra length extending out of the said slot and for use around the winding-drums of the cars, substantially as described.

29. In a system for still-cable roads, the combination, with a double track containing the cable groove or slot, of an endless still cable laid in the said slot and having an extra length extending out of the said slot and for use around the winding-drums of the cars, and a compensating mechanism, substantially as described, for taking care of this extra amount of cable out of the slot or groove, substantially as described.

30. In a system for still-cable roads, the combination, with a double track containing the cable groove or slot, of an endless still cable laid in the said slot and having an extra length extending out of the said slot and for use around the winding-drums of the cars, and a compensating mechanism, substantially as described, for taking care of this extra amount of cable out of the slot or groove, the said mechanism comprising a series of fixed pulleys engaging the cable on one side and a second set of weighted traveling pulleys engaging the opposite side of the cable and arranged alternately with the said fixed pulleys, substantially as described.

31. In a system for still-cable roads, the combination, with a double track containing the cable groove or slot, of an endless still cable laid in the said slot and having an extra length extending out of the said slot and for use around the winding-drums of the cars, and a compensating mechanism, substantially as described, for taking care of this extra amount of cable out of the slot or groove, the said mechanism comprising a series of fixed pulleys engaging one side of the cable, a series of traveling pulleys engaging the said cable on the other side, and a set of light weights and a set of heavy weights hung on the said traveling pulleys, substantially as described.

32. In a system for still-cable roads, the combination, with an endless cable, of a set of fixed pulleys arranged on one side of the said cable and over which the cable passes, a second set of pulleys arranged upon the opposite side of the cable and engaging the same, and trucks adapted to travel on an inclined track arranged at right angles to the movement of the cable, the said trucks supporting the last-named pulleys, substantially as shown and described.

33. In a system for still-cable roads, the combination, with an endless cable, of a set of fixed pulleys arranged on one side of the said cable and over which the cable passes, a second set of pulleys arranged upon the opposite side of the cable and engaging the same, trucks adapted to travel on an inclined track arranged at right angles to the movement of the cable, the said trucks supporting the last-named set of pulleys, and means, substantially as described, for locking the truck in an uppermost position, substantially as shown and described.

34. In a system for still-cable roads, the combination, with an endless cable, of a set of fixed pulleys arranged on one side of the said cable and over which the cable passes, a second set of pulleys arranged upon the opposite side of the cable and engaging the same, trucks adapted to travel on an inclined track arranged at right angles to the movement of the cable, the said trucks supporting the last-named pulleys, and means for pushing the pulleys into an uppermost locked position when arriving near the upper end of its track, substantially as described.

35. In a system for still-cable roads, the combination, with a truck adapted to travel on an inclined track, of a draw-bar fulcrumed on the front end of the said truck, and a pulley supported by the said draw-bar, over which passes the endless still cable, substantially as shown and described.

36. In a system for still-cable roads, the combination, with a truck adapted to travel on an inclined track, of a draw-bar fulcrumed on the front end of the said truck and provided with teeth, a pulley supported by the said draw-bar and over which passes the endless still cable, and a spring-pressed toothed bar adapted to engage the teeth of the said draw-bar, substantially as shown and described.

37. In a system for still-cable roads, the combination, with a truck adapted to travel on an inclined track, of a draw-bar fulcrumed on the front end of the truck and provided with teeth, a pulley supported by the said draw-bar, over which passes the endless still cable, a spring-pressed toothed bar adapted to engage the teeth of said draw-bar, and a fixed spring to deflect the said draw-bar, substantially as shown and described.

LEONARD CUTSHAW.

Witnesses:
HANS J. KNUDSEN,
HENRY C. CASSIDY.